United States Patent [19]

Snyder et al.

[11] Patent Number: 4,854,798
[45] Date of Patent: Aug. 8, 1989

[54] IN-PLACE TENSIONING WASHER

[75] Inventors: David A. Snyder, North Hungtingdon, Pa.; David M. Glosecki, Taylor Springs, Ill.

[73] Assignee: Westinghouse Electric Corp., Pittsburgh, Pa.

[21] Appl. No.: 55,568

[22] Filed: May 29, 1987

[51] Int. Cl.⁴ ............................................. F16B 37/00
[52] U.S. Cl. ...................... 411/434; 29/452; 81/57.38; 254/29 A; 411/546; 411/916
[58] Field of Search .................. 411/19, 10, 434, 391, 411/432, 537, 546, 916, 917, 427; 81/57.38; 254/29 A; 29/452

[56] References Cited

U.S. PATENT DOCUMENTS

| | | | |
|---|---|---|---|
| 3,154,006 | 10/1964 | Novak | 411/434 X |
| 3,424,080 | 1/1969 | Pappas | 411/434 X |
| 3,494,592 | 2/1970 | Meschonat et al. | 254/29 |
| 3,815,874 | 6/1974 | Jones | 254/29 A |
| 3,841,193 | 10/1974 | Ito | 85/9 R |
| 4,075,923 | 2/1978 | Latham | 411/916 X |
| 4,117,369 | 9/1978 | Kuus et al. | 313/558 X |
| 4,120,230 | 10/1978 | Bunyan | 85/1 T |
| 4,182,215 | 1/1980 | Green et al. | 411/434 |
| 4,523,742 | 6/1985 | Reneau | 254/29 A |
| 4,535,656 | 8/1985 | Orban | 81/57.38 |

FOREIGN PATENT DOCUMENTS

| | | | |
|---|---|---|---|
| 629281 | 1/1963 | Belgium | 411/427 |
| 1299259 | 7/1969 | Fed. Rep. of Germany | 411/427 |
| 2341170 | 5/1974 | Fed. Rep. of Germany | 411/434 |
| 2455788 | 8/1976 | Fed. Rep. of Germany | 411/434 |
| 1204925 | 9/1970 | United Kingdom | 411/432 |

Primary Examiner—Neill R. Wilson
Assistant Examiner—Curtis B. Brueske
Attorney, Agent, or Firm—Donald M. Satina

[57] ABSTRACT

The in-place tensioning washer apparatus mounts about a stud to be tensioned. The apparatus has an upper portion, a lower portion, and an expanding torus positioned therebetween. With the stud threaded into the workpiece, the washer is slid onto the stud and a nut is threaded hand tight onto the stud. Pressurization of the torus then forces the upper portion of the apparatus away from the lower portion, putting the stud in tension. Shims are inserted into the gap between the upper and lower portions caused by pressurization of the torus. The torus is then depressurized and the shims maintain the gap between the upper and lower portions, thereby maintaining the stud in tension. To relax the stress in the stud, the torus is repressurized to force the upper and lower portions of the washer apart, freeing the shims for removal. Depressurization of the torus then relaxes the stress in the stud.

20 Claims, 4 Drawing Sheets

FIG. I.

IN-PLACE TENSIONING WASHER

BACKGROUND OF THE INVENTION

Pressure vessels, such as those found in power plants, are provided with a variety of access openings ranging from small hand holes to large reactor vessel covers. The closures must withstand high pressures and usually high temperatures. Optimum closure integrity is achieved through uniformly distributing the load about the closure by uniformly tensioning all of the studs used to support the closure about the access opening.

Off-the-shelf stud tensioning devices include multiple stud tensioning rings which tension all or some of the studs simultaneously. These devices are brought in when needed and removed after use. In some applications, a load cell can be installed permanently about each stud for use when needed.

However, many studs within power plants are subjected to temperatures of up to 1000° F. (538° C.) during operation of the plant. Therefore, permanent load cells are ruled out as they employ rubber or polymer materials for sealing purposes. Also, many of the studs in fossil power plants are of a large bolt diameter. Use of a multiple stud tensioning device or a portable load cell is not always feasible since tensioning of large diameter bolts requires relatively high forces and the spatial constraints associated with power plants may deny access to the large equipment required to deliver these large forces.

An exemplary large bolt diameter which may reach 1000° F. (538°0 C.) during operation is employed on the high pressure/intermediate pressure (HP-IP) turbine cylinder. These cylinders must be opened and resealed once or twice in a five year period. The studs on the cylinder closure must be prestressed to 45,000 psi $(3.17 \times 107$ kg/m$^2$) as the nuts are installed. The hydraulic force on each stud is then relaxed, resulting in a uniform stress level in all studs about the closure. Stud tensioning is not again required until the next opening of the cylinder. Due to the large bolt diameter of the studs used on the HP/IP cylinder closure, no commercial load cells or multiple stud tensioning devices are available. Stud tensioning is presently performed from above by pulling with a hoist. This method of tensioning the studs is extremely time consuming and labor intensive.

What is needed is a device which can be permanently mounted about each stud for prestressing of the studs about the closure and for subsequent stressing of the studs for removal of the closure when necessary. Such a device must be able to tension large diameter bolts and survive an environment which reaches 1000° F. (538° C.).

SUMMARY OF THE INVENTION

The invention is an in-place tensioning washer apparatus for stressing a stud to a predetermined stress level and for maintaining the stud at the predetermined stress level. The stud has a first end in engagement with the workpiece. The apparatus includes an annular ledge, which annular ledge is attached proximate a second end of the stud, and a fluid driven tensioning device for applying force against the annular ledge and against the workpiece to tension the portion of the stud between the annular ledge and the workpiece to the predetermined stress level. The tensioning device includes an upper portion, a lower portion and a torus. The torus is adapted to expand under pressurized fluid to force the upper portion a predetermined distance away from the lower portion to create a gap between the upper and lower portions, movement of the upper portion apart from the lower portion by the predetermined distance acting to force the annular ledge away from the first end of the stud in engagement with the workpiece and to tension the portion of the stud between the annular ledge and the workpiece to the predetermined stress level. The device further includes shims for maintaining the gap between the upper portion and the lower portion after depressurization of the torus. The shims are adapted for insertion into the gap when the torus is pressurized. By maintaining the gap, the shims maintain the upper portion apart from the lower portion by the first predetermined distance and act to maintain the tension in the stud at the predetermined stress level.

The torus is adapted to be repressurized by pressurized fluid to force the upper and lower portions a second predetermined distance away from each other with this second distance being at least as great as the first distance to permit removal of the shims. Depressurization of the torus after removal of the shims will relax the stress level in the stud.

The upper portion of the tensioning washer is removable from the lower portion to enable replacement of the torus. The torus used in the tensioning washer is preferably hollow and comprised of a metallic material to enable it to withstand high temperatures and high internal pressurization. The preferred material for high temperature, high pressure applications is molybdenum or a molybdenum based alloy. For low temperature, low stress applications, a rubber or polymer torus may be employed.

The invention is also directed to a stud tensioning system for tensioning the studs by which a closure is mounted for sealing an opening in a pressure chamber. Each stud has a first end in engagement with the workpiece and an annular ledge is attached proximate a second end of each stud, the second end being opposite the end of the stud in engagement with the workpiece. The system further includes a fluid driven tensioning device for applying force against the annular ledge and against the workpiece to tension the portion of each stud between the annular ledge and the workpiece to a predetermined stress level, a tensioning device being disposed about each stud. Each tensioning device consists of an upper portion, a lower portion, and an annular torus. Each torus is adapted to expand under pressurized fluid to force the upper portion a predetermined distance away from the lower portion to create a gap between the upper portion and the lower portion and to tension each stud to the predetermined stress level. The system further includes shims maintaining the gap between the upper portion and the lower portion of each tensioning device after depressurization of each torus. Maintaining of the gap acting to maintain each upper portion apart from each lower portion by the first predetermined distance to maintain the tension in each stud at the predetermined stress level.

Each torus of the stud tensioning system is adapted to be repressurized by pressurized fluid to force the upper and lower portions a second predetermined distance away from each other with this second distance being at least as great as the first predetermined distance to permit removal of the shims to enable relaxation of the stress level in each of the studs by depressurizing the tori.

The tori are preferably made of metal in order to withstand high temperatures and high stresses. Each tensioning device includes a pressurized fluid connecting fixture for connecting a source of pressurized fluid to each torus. All of the pressurized fluid connecting fixtures are preferably connected by a single pressurized fluid line to permit simultaneous stressing of each of the mounting studs about the closure.

DESCRIPTION OF THE PREFERRED EMBODIMENTS

Figure 1:
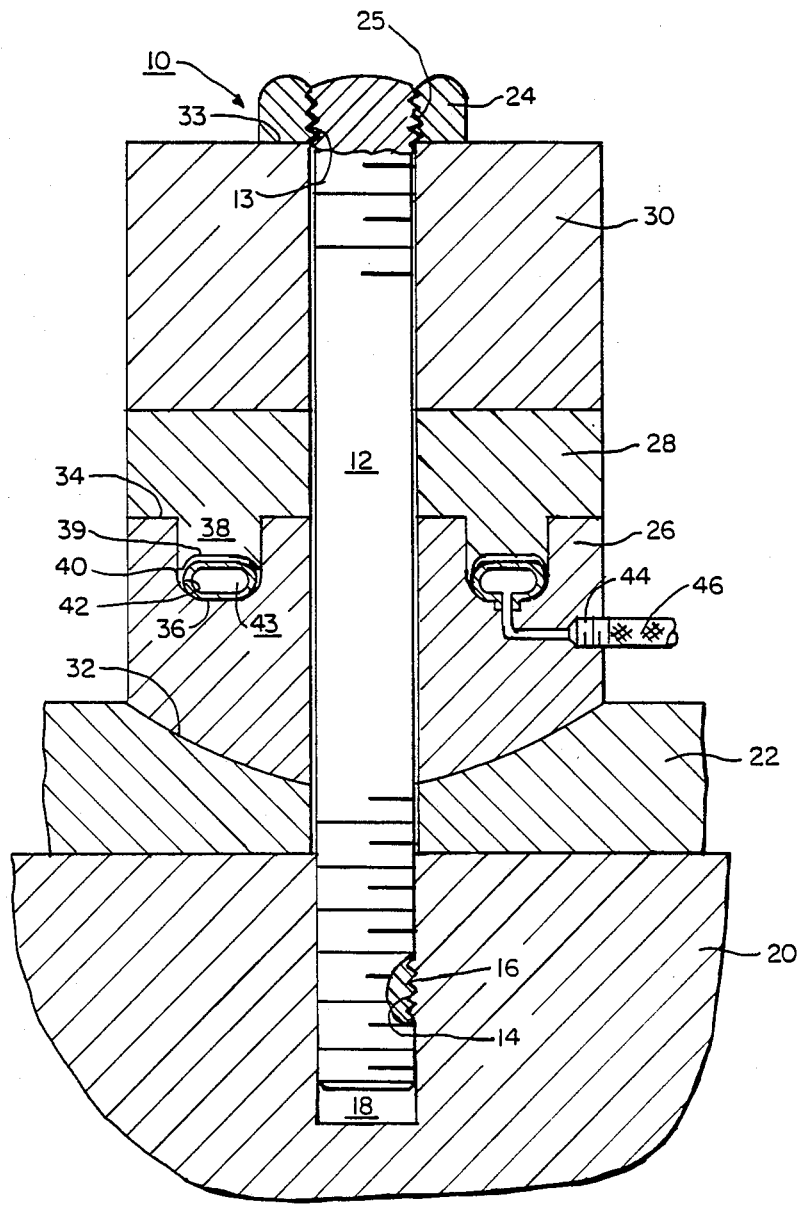
FIG. 1 is a sectional view in elevation of the tensioning washer as mounted about a stud taken along the lines I—I in FIG. 2.

Referring now to the drawings, FIG. 1 depicts the in-place tensioning washer apparatus 10 disposed about a stud 12. Stud 12 is provided with threads 13 about its exterior at one end and with threads 14 about its exterior at the opposite end. Threads 14 engage threads 16 lining cavity 18 within vessel 20. While useful for the many applications requiring prestressing of bolts, it will be clear from the following description that the tensioning washer apparatus of the present invention is particularly well suited for tensioning studs used to retain access covers in the high temperature, high pressure environment associated with power plant operations. Vessel 20 may be any vessel requiring a prestressed stud including nuclear reactor vessels, steam generators, and turbine chambers. Stud 12 cooperates with other studs as observable in FIG. 2 to secure a closure 22 on vessel 20. Due to the high pressures associated with the vessels upon which closure 22 is mounted, the load must be uniformly distributed among the studs 12 so that no stud experiences loads that could lead to failure.

Figure 2:
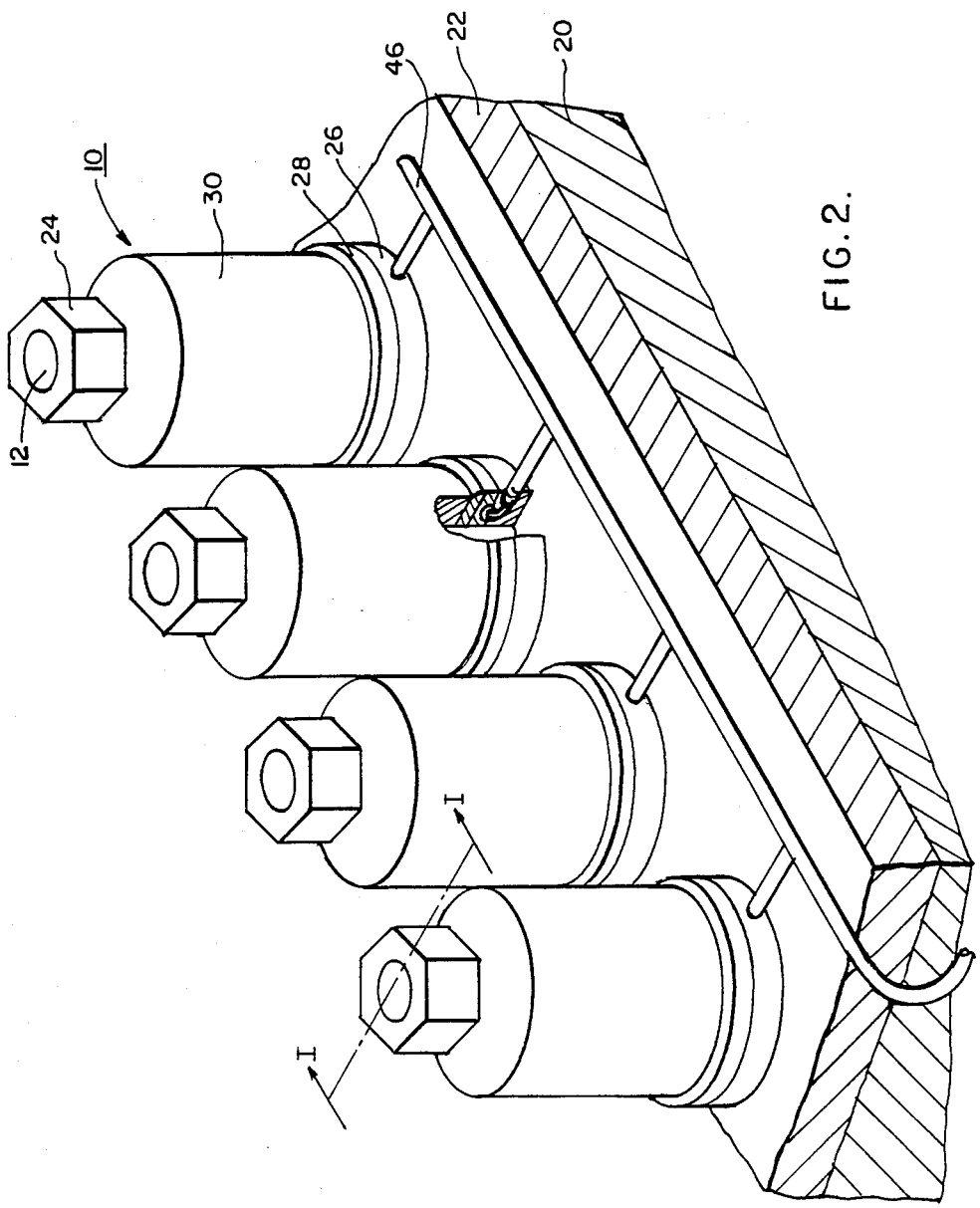
FIG. 2 is a perspective view of a portion of the tensioning washer system according to the invention with parts broken away and with tensioning of only four studs shown for clarity.

Proximate the end of stud 12, opposite the end in engagement with vessel 20, is a nut 24 having interior threads 25. Nut 24 holds the closure 22 onto vessel 20. Nut 24 also serves as a ledge against which pressure is applied to tension the stud. Nut 24 may be attached to an upper segment of tensioning washer 10 but is preferably separate. Threads 25 of nut 24 engage threads 13 of stud 12 provided at the end of stud 12 opposite the end in engagement with vessel 20. Some closure applications employ a bolt instead of a stud. The tensioning washer can also be used to tension bolts with the bolt shaft acting as the stud and the bolt head acting as the ledge. Through-bolts, which have a threaded shaft with a nut on each end, can also be tensioned using this apparatus. Disposed between closure 22 and nut 24 are lower washer portion 26 and upper washer portion 28. A spacer 30, which may be required for relatively long studs, is preferably positioned between nut 24 and upper washer portion 28. The bottom face 32 of the lower washer portion 26 contacts closure 22. The bottom annular ledge 33 of nut 24 or of the bolt head of the alternative embodiment described above is contacted by the upper surface of upper washer portion 28 or, when spacer 30 is used, by the upper surface of spacer 30. In the upper surface 34 of lower washer portion 26 is formed an annular groove 36. Upper washer portion 28 is provided with an annular protrusion 38 which extends into annular groove 36. Annular protrusion is preferably provided with a depression 39. In the preferred embodiment, annular groove 36 and depression 39 of protrusion 38 cooperate to form a doughnut-shaped cavity 40. Within cavity 40 is positioned a toroid 42 which is preferably of a doughnut-shaped cross-section in the expanded condition and is hereafter referred to as a torus, the torus 42 having a hollow central cavity 43. The toroidal shape of torus 42 is preferred since there are no stress concentration points and the entire torus undergoes tensile hoop stressing during expansion. Conversely, a rectangular or other shaped toroid could be used but would have stress concentration points, limiting the maximum stress levels achievable. Torus 42 is coupled by pressurized fluid supply fixture 44 to a pressurized fluid supply line 46. Only four studs 12, four stud tensioning washers 10, and a portion of closure 22 are depicted in FIG. 2 for clarity.

Figure 3:
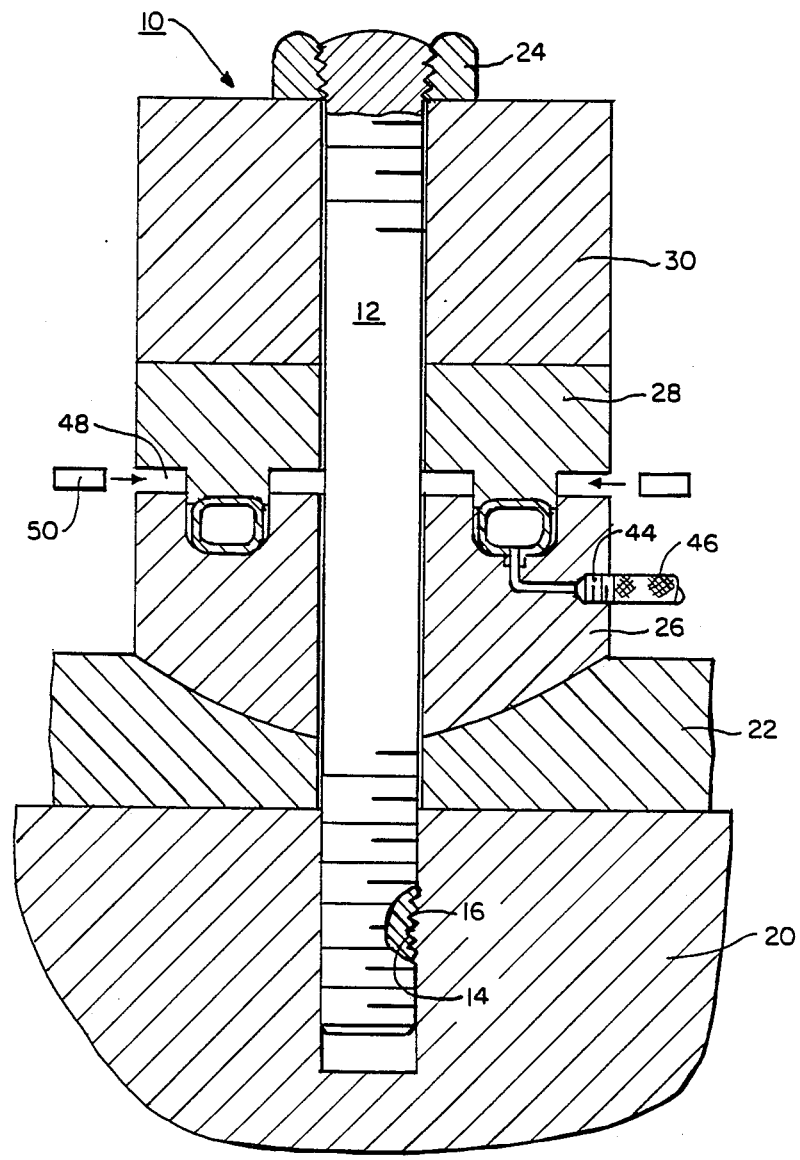
FIG. 3 is a sectional view in elevation of the tensioning washer of FIG. 1 with the torus in the expanded condition.

In operation, torus 42 is positioned between lower washer portion 26 and upper washer portion 28. Lower washer portion 26, upper washer portion 28, and spacer 30 are then slid onto stud 12. Nut 24 is threaded hand-tight onto stud 12 so that annular ledge 33 contacts the upper surface of spacer 30. Pressurized fluid line 46 is then coupled to fluid supply fixture 44. Pressurized fluid is supplied to the hollow central cavity 43 of torus 42 through fluid supply line 46 and fluid fixture 44, causing torus 42 to expand. The torus 42 expands into contact with the bottom surface 39 of protrusion 38, exerting a force on protrusion 38 which forces upper washer portion 28 away from lower washer portion 26. As depicted in FIG. 3, a gap 48 between upper washer portion 28 and lower washer portion 26 results. Since stud 12 is threaded into vessel 20 and nut 24 is initially threaded onto stud 12 hand-tight to place annular ledge 33 into contact with spacer 30, eliminating any gaps between nut 24, spacer 30, upper washer portion 28, lower washer portion 26, and closure 22, movement of upper washer portion 28 with respect to lower washer 26 by expansion of torus 42 also moves nut 24 (and spacer 30 when used) and causes stud 12 to be put into tension between threads 25 of nut 24 and threads 16 of vessel 20. By forcing upper washer portion 28 a predetermined distance away from lower washer portion 26, a predetermined stress level within stud 12 is developed. Shims 50, which are preferably half-moon shaped and are manufactured to a predetermined thickness, can then be inserted into gap 48. The shims are substantially undeformable and act to maintain gap 48 between upper and lower washer portions 28 and 26 after release of the internal pressurization of torus 42, thereby perpetuating the predetermined stress level within stud 12.

When closure 22 is next to be removed, torus 42 is pressurized to the original pressure or to a slightly higher value, creating a gap the same as or slightly larger than gap 48, enabling the shims 50 to be easily removed. Depressurization of torus 42 now results in relaxation of the stress level in stud 12, making possible hand removal of nut 24 and washer 10 and freeing the closure for removal.

A commercially available high pressure pump and pressure regulator (not shown) supplies pressurized fluid at a predetermined pressure level through fluid supply line 46 to fluid fixture 44 and thereby to torus 42. The torus is expanded to a predetermined pressure, forcing the upper washer portion 28 a predetermined distance away from the lower washer portion 26. This predetermined axial movement causes nut 24 to move a predetermined distance, imparting tension to stud 12 at a predetermined level. This predetermined stress level can then be maintained by shims 50, which are sized according to the predetermined gap 48 formed by the relative movement of upper washer portion 28 with respect to lower washer portion 26. While the pressure parameters are dependent on the diameter and length of the stud as well as on the size of the torus and washer assembly, the three inch (0.0762 m) diameter bolts on a HP/IP turbine are to be tensioned to approximately 45,000 psi ($3.17 \times 10^7$ kg/m$^2$).

Through use of interconnecting fluid supply line 46 depicted in FIG. 2, in-place tensioning washers 10 mounted about each closure mounting stud 12 can be pressurized in unison, thereby simultaneously and uniformly prestressing each stud 12. Insertion of shims 50 and depressurization of the fluid supply line is then all that is required for uniformly stressing all studs about a closure.

Figure 4:
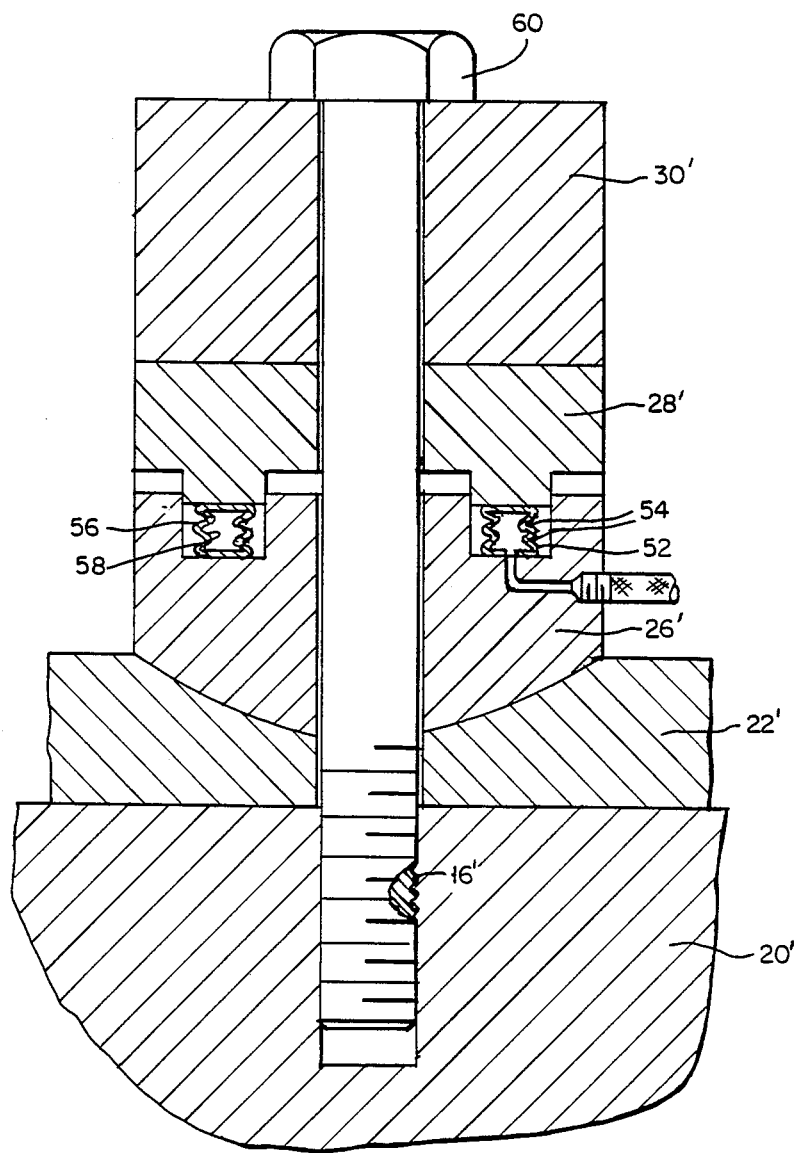
FIG. 4 is a sectional view in elevation of an alternative embodiment of the tensioning washer having an annular bellows instead of a torus.

In order for the system to function as an inplace tensioner in many power plant applications, the apparatus 10 must survive an environment which reaches 1000° F. (538° C.). The tensioning apparatus must be able to function after ten years in service and must be able to subsequently stress the stud or bolt to a great enough extension that shims 50 can be removed. In order to achieve these criteria, a metallic material is preferred for the torus 42. The preferred metallic material for the torus is molybdenum, which has a yield strength of about 80,000 psi ($5.63 \times 10^7$ kg/m$^2$). Molybdenum based alloys could also be employed. The preferred shape for the torus is as depicted in FIG. 1. The torus is internally pressurized to up to 80,000 psi ($5.63 \times 10^7$) kg/m$^2$) in order to achieve the 45,000 psi ($3.17 \times 10^7$ kg/m$^2$) stress level desired in HP-IP turbine studs. This high internal pressure acts to plastically deform the torus. However, the torus retains sufficient strength and elasticity to be repressurized to slightly more than 80,000 psi ($5.63 \times 10^7$ kg/m$^2$) for shim removal. The used torus is then replaced with a new one for the next cycle by separating upper and lower washer portions 28 and 26. Alternative embodiments of the torus such as the embodiment depicted in FIG. 4 are also possible. In the embodiment of FIG. 4, the torus 52, shown in the expanded condition, is formed like an annular bellows. Circumferential folds 54 open and close in response to pressurization and depressurization respectively to permit the torus to expand and contract. FIG. 4 also illustrates tensioning of a bolt 60 rather than a stud.

The torus may be manufactured from a material such as rubber or a polymer for stressing relatively small diameter bolts which do not experience high temperatures. However, for the system to function as an in-place tensioner in many power plant applications, the apparatus 10 must be able to survive an environment which may reach up to 1000° F. (538° C.). The tensioning apparatus must be able to retain a closure on a vessel which experiences high internal pressures. With stud 12 engaging workpiece 20, the closure is retained on workpiece 20 with force passing through lower washer portion 26, upper washer portion 28, and, for relatively long studs, spacer 30, The torus is used only during installation and removal of closure 22 and is otherwise depressurized. In such applications, the tensioning apparatus must be able to stress the bolt to a great enough extension that shims 50 can be removed, even after as long as 20 years in service. In order to achieve these criteria, the torus 42 must be manufactured from a strong yet elastic temperature-resistant material. Since current polymer technology does not include a polymer which can withstand such temperatures, a metallic material is presently preferred. The preferred metallic material is molybdenum and the preferred shape is the toroidal shape depicted in FIG. 1 since a toroidal structure is the annular structure which can tolerate the greatest internal pressure. The torus is pressurized up to 80,000 psi ($5.63 \times 10^7$ kg/m$^2$) in order to achieve the 45,000 psi ($3.17 \times 10^7$ kg/m$^2$) stress level desired in the three-inch (0.0762 m) diameter HP/IP turbine studs. Smaller bolt diameters would require significantly lower pressures. The high internal pressure used to stress the HP/IP studs acts to plastically deform the metallic torus. However, the torus retains sufficient strength and elasticity to be repressurized to the same or slightly higher than the original level of pressurization for shim removal. The used torus is then preferably replaced with a new one for the next cycle by separating upper and lower washer portions 28 and 26 after annular ledge 33 has been removed by unthreading nut 24 in the preferred embodiment. As previously described, alternative embodiments of the torus, such as that depicted in FIG. 4, are possible. In the embodiment of FIG. 4, the torus 52, shown in the expanded condition, is shaped and performs like a bellows. Folds 54 extend circumferentially about the outer surface 56 and the inner surface 58 and act as hinges to allow torus 52 to collapse upon depressurization.

Therefore, the present invention contemplates the use of an in-place tensioning washer system particularly useful for tensioning large studs which experience high temperatures. The system preferably employs a metallic torus which stresses a stud from beneath the nut which holds the closure against the vessel. The invention contemplates the insertion of shims into the gap which is formed between the upper and lower portions of the tensioning apparatus when the torus expands under pressurization. The shims act to maintain the gap and thereby perpetuate the predetermined stress level within the stud. The system is capable of withstanding long exposure at elevated temperatures.

While there has been described what at present is considered to be the preferred embodiment of the invention, it will be understood that various modifications and alterations may be made therein without departing from the true spirit and scope of the invention and it is intended to cover all such modifications and alterations in the claims appended hereto.

We claim:

1. An in-place tensioning washer apparatus for stressing a power plant pressure chamber cover retaining stud to apredetermined stress level for installing and removing a pressure chamber cover and for maintaining the pressure chamber cover retaining stud at the predetermined stress level between installation and removal of the cover during periods of exposure of the stud, pressure chamber and the tensioning washer apparatus to temperatures up to 1000° F. and internal pressurization of the pressure chamber resulting from steam production as the power plant is operated, the stud having a first end in engagement with the pressure chamber, an annular ledge being attached proximate a second end of the stud, the second end being opposite the first end in engagement with the pressure chamber, said apparatus comprising:

fluid driven tensioning means for applying force against the annular ledge and against the pressure chamber to tension the portion of the stud between the annular ledge and the pressure chamber to the predetermined stress level, said tensioning means comprising an upper portion, a lower portion, and an annular toroid, the toroid being comprised of a high temperature resistant material and being adapted to expand under pressurized fluid to force the upper portion a first predetermined distance apart from the lower portion to create a gap between the upper and the lower portions, movement of the upper portion apart from the lower portion by the first predetermined distance acting to force the annular ledge away from the first end of the stud in engagement with the pressure chamber and to tension the portion of the stud between the annular ledge and the pressure chamber to the predetermined stress level, the tensioning means remaining between the annular ledge and the pressure chamber between installation and removal of the cover, the toroid being adapted to withstand the high temperatures associated with steam production during operation of the power plant, and shim means for maintaining the gap after depressurization of the toroid, said shim means being adapted for insertion into the gap when the toroid is in the expanded condition, maintenance of the gap acting to maintain the upper portion apart from the lower portion by the first predetermined distance and to maintain the tension in the stud at the predetermined stress level.

2. The tensioning washer apparatus according to claim 1, wherein the toroid is adapted to be repressurized by pressurized fluid to force the upper and the lower portions a second predetermined distance away from each other, the second predetermined distance being at least as great as the first predetermined distance to permit removal of said shim means, depressurization of the toroid after removal of said shim means acting to relax the stress level in the stud.

3. The tensioning washer apparatus according to claim 2, wherein the annular ledge comprises a nut.

4. The tensioning washer apparatus according to claim 3, wherein the upper portion is separable from the lower portion after the nut has been removed from the stud, separation of the upper portion from the lower portion permitting replacement of the toroid.

5. The tensioning washer apparatus according to claim 4, wherein the toroid is comprised of a metallic material.

6. The tensioning washer apparatus according to claim 5, further comprising pressurized fluid connecting means for connecting a source of pressurized fluid to the toroid.

7. The tensioning washer apparatus according to claim 6, wherein the metallic toroid is adapted to withstand internal pressurization of at least about 80,000 psi without rupturing.

8. The tensioning washer apparatus according to claim 7, further comprising interconnecting fluid supply line means for interconnecting the pressurized fluid connecting means of a plurality of tensioning washer apparatuses for simultaneous stressing of a plurality of studs.

9. The tensioning washer according to claim 7, wherein the toroid is comprised of a material selected from the group consisting of molybdenum and molybdenum based alloys.

10. The tensioning washer apparatus according to claim 5, wherein the toroid is provided with circumferential fold means for opening and closing in response to pressurization and depressurization of the toroid for enabling the torus to expand and contract.

11. An in-place stud tensioning system for simultaneously tensioning a plurality of studs by which a power plant pressure chamber closure is mounted for sealing and unsealing of an opening in a power plant pressure chamber to a predetermined stress level for installing and removing the closure and for maintaining the predetermined stress level in the studs during exposure to temperatures up to 1000° F. an internal pressurization of the pressure chamber as the power plant is operated, each stud having a first end in engagement with the pressure chamber, an annular ledge being attached proximate a second end of each stud, the second end being opposite the first end in engagement with the pressure chamber, said stud tensioning system comprising;

fluid driven tensioning means for applying force against each annular ledge and against the pressure chamber to tension the portion of each stud between each annular ledge and the pressure chamber to the predetermined stress level, each said tensioning means comprising an upper portion, a lower portion, and an annular toroid, the toroid being comprised of a high temperature resistant material and being adapted to expand under pressurized fluid to force the upper portion of each tensioning means a first predetermined distance apart from the lower portion of each tensioning means to create a gap between each upper portion and each lower portion, each upper portion contacting an annular ledge, expansion of each toroid by pressurized fluid urging each annular ledge away from the first end of each stud in engagement with the pressure chamber to tension all of the pressure chamber closure retaining studs simultaneously to a predetermined stress level, the tensioning means remaining between each annular ledge and the pressure chamber between sealing and unsealing of the opening in the pressure chamber during operation of the power plant, and shim means for maintaining each gap after depressurization of each toroid, said shim means being adapted for insertion into each gap when each toroid is in the expanded condition, maintenance of each gap acting to maintain each upper portion apart from each lower portion by the first predetermined distance and to maintain the tension in each stud at the predetermined stress level.

12. The stud tensioning system according to claim 11, wherein each toroid is adapted to be repressurized by pressurized fluid to force each upper lower portion a second predetermined distance away from each lower portion, the second predetermined distance being at least as great as the first predetermined distance to permit removal of said shim means to enable relaxation of the stress level in each stud by depressurizing each torus.

13. The stud tensioning system according to claim 12, wherein each toroid is metallic.

14. The stud tensioning system according to claim 13, wherein each toroid is adapted to withstand internal pressurization of at least about 80,000 psi.

15. The stud tensioning system according to claim 14, wherein each toroid is comprised of a material selected from the group consisting of molybdenum and molybdenum based alloys.

16. The stud tensioning system according to claim 14, wherein each toroid is provided with circumferential fold means for opening and closing in response to pressurization and depressurization of each toroid to enable each toroid to expand upon pressurization and to contract upon depressurization.

17. An in-place tensioning washer apparatus for stressing a power plant pressure vessel cover retaining stud to a predetermined stress level and for maintaining the predetermined stress level in the stud during periods of exposure of the stud, pressure vessel and the tensioning washer apparatus to temperatures up to 1000° F. and internal pressurization of the pressure vessel resulting from steam production as the power plant is operated, the stud having a first end in engagement with the pressure vessel, a nut being attached proximate a second end of the stud, the stud and nut cooperating to retain a closure on the vessel, said tensioning washer apparatus comprising:

fluid driven tensioning means for applying force against the nut and against the pressure vessel to tension the portion of the stud between the nut and the pressure vessel to the predetermined stress level, said tensioning means comprising an upper portion, a lower portion, a hollow metallic toroid, and pressurized fluid connecting means for connecting a source of pressurized fluid to the toroid, the toroid being adapted to expand under pressurized fluid to force the upper portion a first predetermined distance apart from the lower portion to create a gap between the upper portion and the lower portion, movement of the upper portion away from the lower portion acting to tension the stud to the predetermined stress level, shim means for maintaining the gap after depressurization of the toroid, said shim means being adapted for insertion into the gap when the toroid is in the expanded condition, maintenance of the gap acting to maintain the upper portion apart from the lower portion by the first predetermined distance and to maintain the tension in the stud at the predetermined stress level, the toroid also being adapted to be repressurized by pressurized fluid to force the upper portion a second predetermined distance away from the lower portion, the second predetermined distance being at least as great as the first predetermined distance to permit removal of said shim means, depressurization of the toroid after removal of said shim means acting to relax the stress level in the stud.

18. The in-place tensioning washer apparatus according to claim 17 wherein the toroid is adapted to withstand internal pressurization up to at least about 80,000 psi.

19. The in-place tensioning washer apparatus according to claim 18, wherein the toroid is comprised of a material selected from the group consisting molybdenum and molybdenum based alloys.

20. The in-place tensioning washer apparatus according to claim 17, wherein the toroid is provided with circumferential fold means for opening and closing in response to pressurization and depressurization of the torus to enable the toroid to expand and contract.

* * * * *